(12) United States Patent
Bartos et al.

(10) Patent No.: US 7,201,418 B2
(45) Date of Patent: Apr. 10, 2007

(54) SLIDING VEHICLE LOAD FLOOR

(75) Inventors: Andrew L. Bartos, Clarkston, MI (US); Robin Stevenson, Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 179 days.

(21) Appl. No.: 11/007,871

(22) Filed: Dec. 9, 2004

(65) Prior Publication Data
US 2005/0285422 A1 Dec. 29, 2005

Related U.S. Application Data

(60) Provisional application No. 60/583,050, filed on Jun. 25, 2004.

(51) Int. Cl.
*B62D 25/20* (2006.01)
(52) U.S. Cl. .................. 296/26.01; 296/26.09
(58) Field of Classification Search ............. 296/26.08, 296/26.09, 26.01, 57.1; 414/522, 537
See application file for complete search history.

(56) References Cited

U.S. PATENT DOCUMENTS

| | | | |
|---|---|---|---|
| 4,950,123 A * | 8/1990 | Brockhaus | 414/522 |
| 5,046,913 A * | 9/1991 | Domek et al. | 414/522 |
| 5,513,941 A | 5/1996 | Kulas et al. | 414/522 |
| 5,934,725 A | 8/1999 | Bowers | 296/26.09 |
| 5,938,262 A * | 8/1999 | Mills | 296/26.09 |
| 5,944,371 A * | 8/1999 | Steiner et al. | 296/26.09 |
| 6,120,075 A | 9/2000 | Terry | 296/26.09 |
| 6,312,034 B1 * | 11/2001 | Coleman et al. | 296/26.1 |
| 6,390,525 B2 | 5/2002 | Carpenter et al. | 296/26.09 |
| 6,478,355 B1 | 11/2002 | Van Eden et al. | 296/37.6 |
| 6,503,036 B1 | 1/2003 | Bequette et al. | 410/94 |
| 6,659,524 B1 | 12/2003 | Carlson | 296/26.09 |
| 6,976,720 B1 * | 12/2005 | Bequette | 296/26.09 |

* cited by examiner

*Primary Examiner*—Dennis H. Pedder
*Assistant Examiner*—Melissa A. Black
(74) *Attorney, Agent, or Firm*—Kathryn A. Marra

(57) ABSTRACT

A load floor assembly includes a load floor and a frame. The frame supports the load floor, and the load floor is movable with respect to the frame between a first position in which the load floor is entirely located within a vehicle cargo area, and a second position in which at least a portion of the load floor extends rearward of a rear body opening. The load floor is preferably movable to a third position forward of the first position in which increased vehicle body floor space is exposed adjacent to the rear body opening. A ramp surface supports the forward portion of the load floor in the third position to prevent a cantilevered condition. The load floor preferably includes two handles that are operative to disengage a latch for selective movement of the load floor between the positions.

16 Claims, 8 Drawing Sheets

SLIDING VEHICLE LOAD FLOOR

CROSS REFERENCE TO RELATED APPLICATION

This application claims the benefit of U.S. Provisional Application No. 60/583,050 filed Jun. 25, 2004, and which is hereby incorporated by reference in its entirety.

TECHNICAL FIELD

This invention relates to vehicle load floors that are selectively movable between a forward, stowed position in which the load floor is contained within a cargo area defined by a vehicle body, and a rearward, extended position in which at least a portion of the load floor extends outward from a rear opening of the vehicle body.

BACKGROUND OF THE INVENTION

Many vehicles, such as hatchbacks, minivans, and sport-utility vehicles, have a cargo area located in the rear of the vehicle. The cargo area typically extends transversely with respect to the vehicle between laterally-disposed interior trim panels, and longitudinally with respect to the vehicle between a rear body opening and a row of passenger seats. The cargo area also typically extends vertically from the vehicle floor to the vehicle roof.

The rear body opening provides access to the cargo area from the exterior of the vehicle, and a rear closure panel, such as a rear liftgate or endgate, selectively closes the rear body opening.

SUMMARY OF THE INVENTION

A vehicle includes a body defining a cargo area and a rear body opening adjacent to the cargo area. A load floor assembly includes a frame and a load floor. The frame supports the load floor above the vehicle body floor. The load floor is selectively movable with respect to the frame for movement between three positions. In a first, stowed position, the load floor is entirely located within the cargo area and forward of the rear body opening. In a second, extended position, at least a portion of the load floor extends rearward of the body opening to facilitate the loading of cargo into the cargo compartment. In a third, stowed position forward, the load floor is more forwardly located than in the first, stowed position to provide floor space at the rear of the vehicle for storing or transporting more items.

When the load floor is in the third position, the forwardmost portion of the load floor may extend sufficiently beyond the forwardmost extent of the frame so as to be cantilevered beyond the frame. Accordingly, a member preferably defines an inclined surface that exerts a force having a vertical component on the forward portion of the load floor when the load floor is in the third position, but not in the first and second positions. The inclined surface thus eliminates the cantilevered condition of the load floor, and correspondingly eliminates rattles and vibrations that may be caused by an unsupported, cantilevered portion of the load floor.

In another preferred embodiment, the load floor assembly includes a latch member and a detent member that defines a plurality of notches. The latch member is selectively engageable with the detent member by at least partially entering one of the plurality of notches to restrict relative fore/aft movement between the load floor and the frame. The latch member is spring biased to exert a vertical force, or a force having a vertical component, on the detent member to eliminate any vertical clearances between the load floor and the frame, thereby preventing squeaks and rattles.

The load floor assembly preferably includes a first handle operatively connected with respect to the load floor for movement therewith, and a second handle that remains generally adjacent to the rear portion of the frame when the load floor is in the third position. The first and second handles are operative to selectively disengage the latch. Accordingly, when the load floor is in the third position, the second handle remains adjacent the rear of the vehicle and within reach of a vehicle user at the rear body opening. In an exemplary embodiment, a flexible member interconnects the first and second handles. A tension device, such as an elastic member, is connected to the flexible member to remove slack from the flexible member.

The above objects, features and advantages, and other objects, features and advantages of the present invention are readily apparent from the following detailed description of the best modes for carrying out the invention when taken in connection with the accompanying drawings.

DESCRIPTION OF THE PREFERRED EMBODIMENTS

Figure 1:
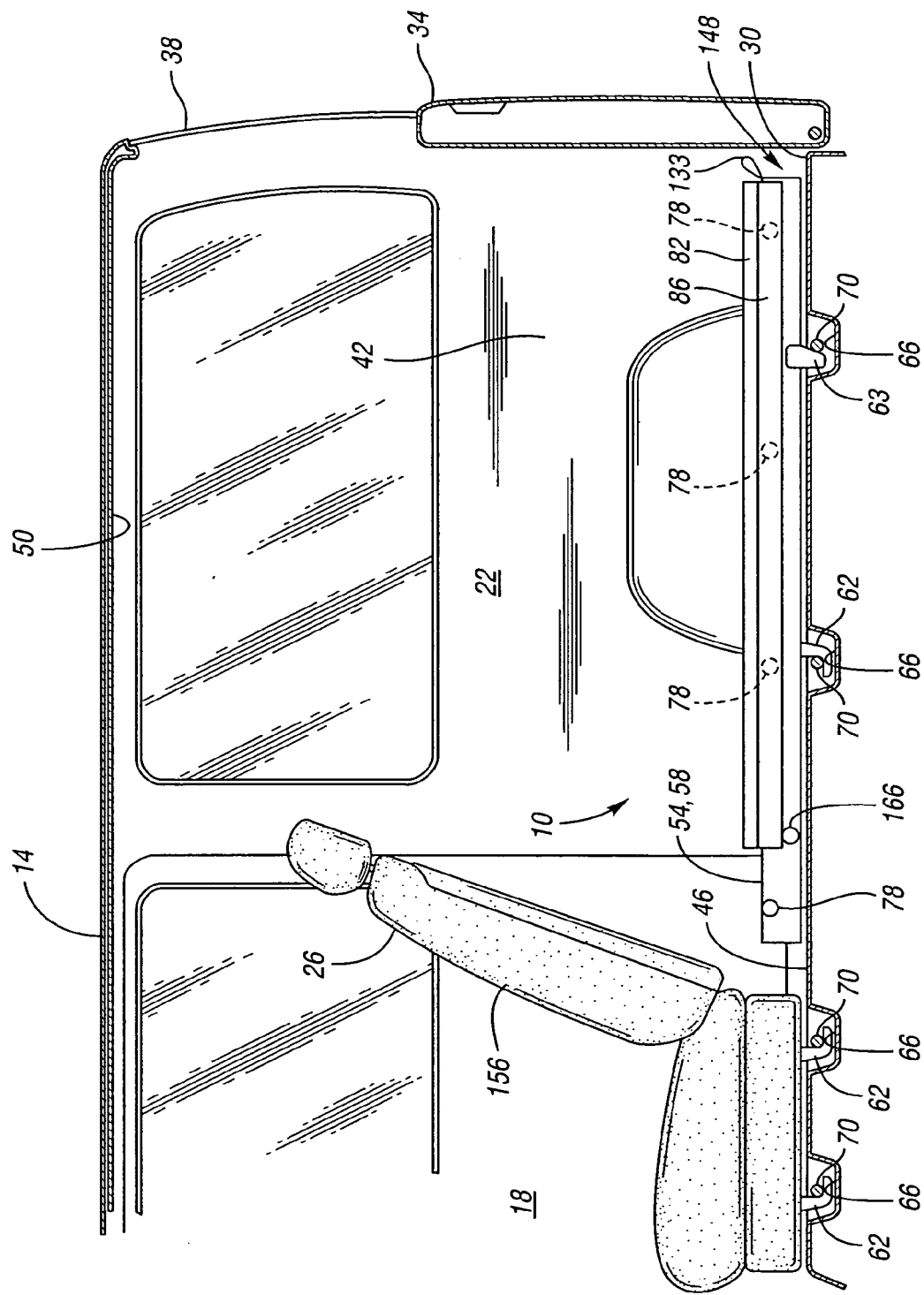
FIG. 1 is a schematic, sectional side view of a vehicle body defining a cargo area having a sliding load floor assembly mounted therein.

Referring to FIG. 1, a sliding load floor assembly 10 for a sport utility vehicle is schematically depicted. The body 14 of the sport utility vehicle defines a passenger space 18 and a rear cargo area 22. The cargo area 22 extends longitudinally with respect to the body 14 between a rear row of passenger seats 26 and a rear body opening 30. The body 14 includes a rear closure panel such as tailgate assembly 34 with retractable window 38. The tailgate assembly 34 is selectively movable between an open position (shown at 34' in FIG. 9) in which a vehicle user can access the cargo area 22 from outside the vehicle body 14 through the rear body opening 30, and a closed position, as depicted in FIG. 1, in which the tailgate assembly 34 closes and seals the rear body opening 30. The cargo area 22 extends transversely with respect to the body 14 between two interior trim panels 42, and the cargo area 22 extends vertically from a vehicle body floor 46 to a vehicle body roof 50.

The sliding load floor assembly 10 includes a stationary frame 54 rigidly connected to floor 46 of the vehicle body. The frame 54 includes two longitudinally oriented rails 58. The frame 54 also includes connective elements such as hooks 62, 63 connected to the rails 58. The floor 46 defines a plurality of wells 66 containing anchor pins 70 that releasably engage hooks 62 for releasably connecting the frame 54 to the floor 46. However, alternative means of releasably attaching the rails 58 to the floor 46, such as bolts or clamps, may be employed within the scope of the claimed invention. The rails 58 may also be permanently affixed to the floor 46, such as by riveting or welding, within the scope of the claimed invention. Although the frame 54 is preferable releasably mounted to the floor, other frame and rail configurations may be employed within the scope of the claimed invention. For example, the rails may be attached to, or integrally formed in, lateral trim panels 42.

Figure 2:
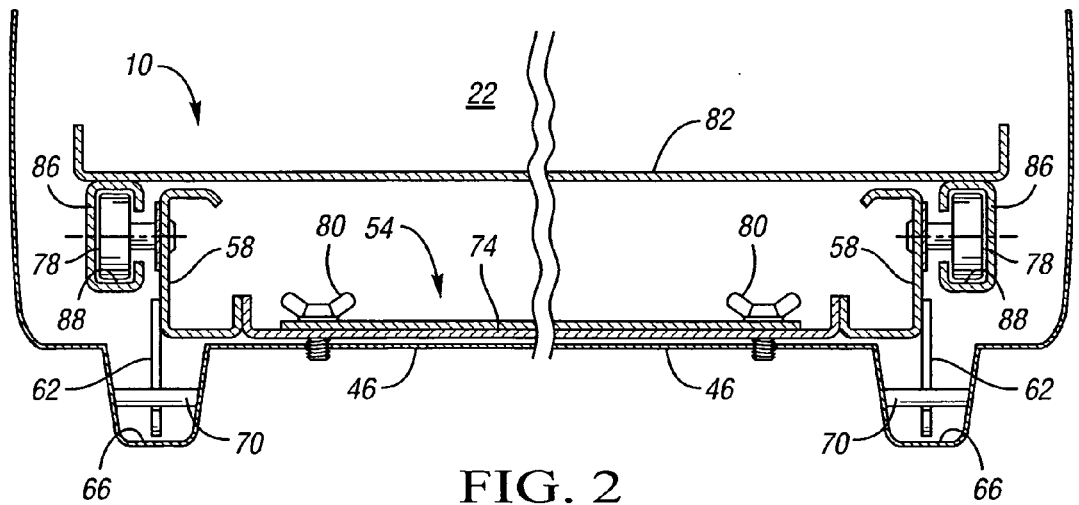
FIG. 2 is a schematic, cross-sectional front view of the sliding load floor assembly and a portion of the vehicle body of FIG. 1.

Referring to FIG. 2, wherein like reference numbers refer to like components from FIG. 1, the rails 58 are spaced a distance apart from one another, and are interconnected by at least one cross-member 74. Those skilled in the art will recognize a variety of cross-member configurations that may be employed within the scope of the claimed invention. It may be desirable for the cross members to comprise a C-section channel mounted such that the flanges abut the vehicle floor 46. It may also be desirable to employ braces or other strengthening members to provide stiffness to the rails 58.

A plurality of roller elements 78 are rotatably connected to each of the rails 58. Securing devices that require no hand tools, such as knurled thumbscrews or wing nuts 80, are preferably used to interconnect cross-member 74 and floor 46, thereby cooperating with hooks 62 and anchor pins 70 to secure the frame 54 in place. Spring-loaded, quick-release latching devices (not shown), such as those employed on removable seats, may be used to secure the frame 54 to the floor 46 instead of, or in conjunction with, the simple hook 62 and anchor pin 70 interaction shown in FIGS. 1 and 2.

The sliding load floor assembly 10 also includes a load floor 82 and two tracks 86 spaced a distance apart from one another and rigidly connected to the load floor 82. The tracks define channels 88, i.e., receptive cavities, that receive roller elements 78. The tracks 86 and roller elements 78 cooperate to allow selective fore and aft translation of the load floor 82 while restricting, through physical part interference, relative vertical and transverse movement between the load floor 82 and the frame 54. It may be desirable to provide ramps (not shown) on the tracks 86 at both ends to provide a lead-in for the roller elements 78 to facilitate the entry of roller elements into the track. The roller elements 78 are strategically located on the rails 58 to provide support to the load floor 82 in the three positions shown in FIGS. 8–10. Additional roller elements may be added to the rails as necessary or desirable. Nonmetallic surfaces on the roller element faces that contact the track 86 may be desirable to reduce squeaks and rattles. Alternatively, and within the scope of the claimed invention, the roller elements 78 could be affixed to the underside of the load floor 82, and the tracks 86 could be anchored with respect to the vehicle body floor.

Figure 3:
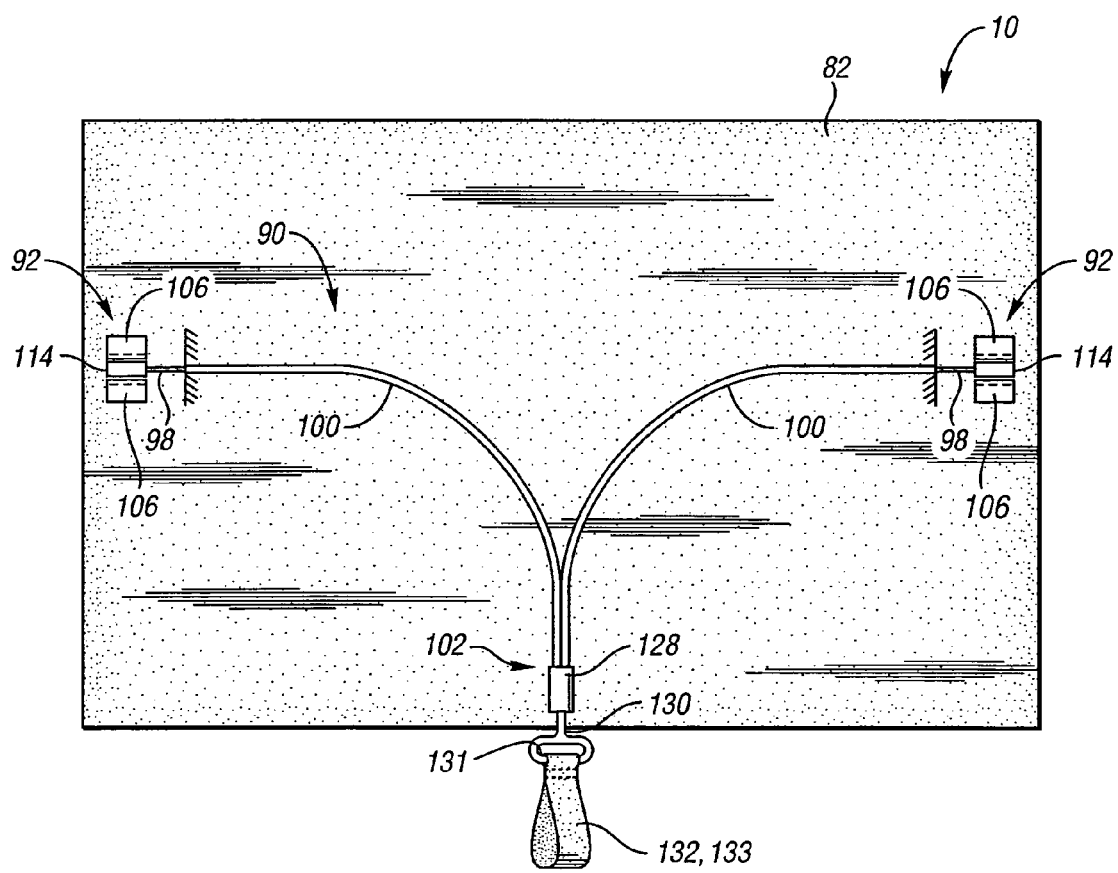
FIG. 3 is a schematic bottom view of the load floor and latching system of the sliding load floor assembly of FIG. 1.

Referring to FIG. 3, wherein like reference numbers refer to like components from FIGS. 1 and 2, the load floor assembly 10 includes a locking system configured to selectively restrict movement of the load floor 82 with respect to the frame 54. The locking system includes a latching system 90 having two latches 92 rigidly connected with respect to the load floor 82. The locking system also includes a plurality of recesses or notches (shown at 94A, 94B, 94C in FIGS. 8–10) defined by the rails; accordingly, the rails are "detent members." Each latch 92 is selectively engageable with one of the notches to 94A, 94B, 94C to restrict fore and aft translation of the load floor 82 with respect to the frame 54 and the vehicle body 14. The latching system 90 also includes two flexible Bowden-style cables 98 movable within a sheath 100. Each cable 98 is operatively connected to a respective latch 92 at one end and to a handle assembly 102 at the other end to transmit force from the handle assembly 102 to the latches 92 and thereby disengage the latches.

Figure 4:
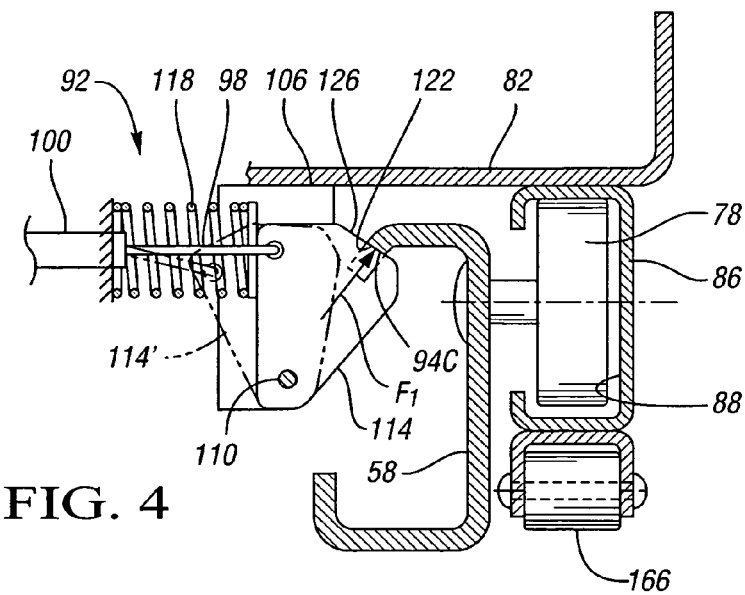
FIG. 4 is a schematic, sectional front view of a rail and track of the sliding load floor assembly of FIG. 1.
Figure 5:
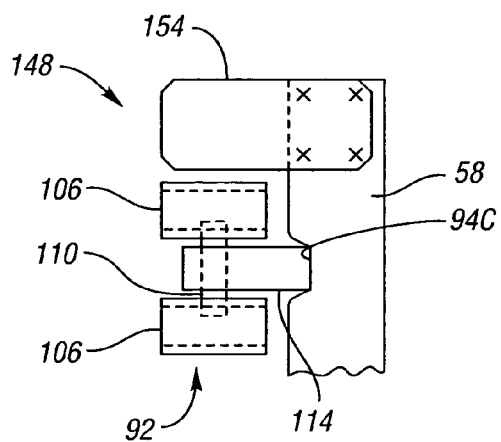
FIG. 5 is a schematic top view of a portion of the rail and latch of FIG. 4.

Referring to FIGS. 4 and 5, wherein like reference numbers refer to like components from FIGS. 1–3, each latch 92 includes two brackets 106 mounted to the underside of the load floor 82. A pin 110 extends between, and is supported by, the two brackets 106. A latch member, such as latch plate 114, is pivotably mounted to the pin 110. One of the cables 98 is operatively connected to the latch plate 114 such that movement of the cable causes the latch plate to pivot about the pin from an engaged or extended position, shown at 114, to a disengaged or retracted position, shown in phantom at 114'. A spring 118 biases the latch plate in the engaged position. The spring 118 in the embodiment depicted is a coil spring; however, those skilled in the art will recognize a variety of spring configurations that may be employed within the scope of the claimed invention, such as torsion springs mounted on the axis of pins 110.

Figure 8:
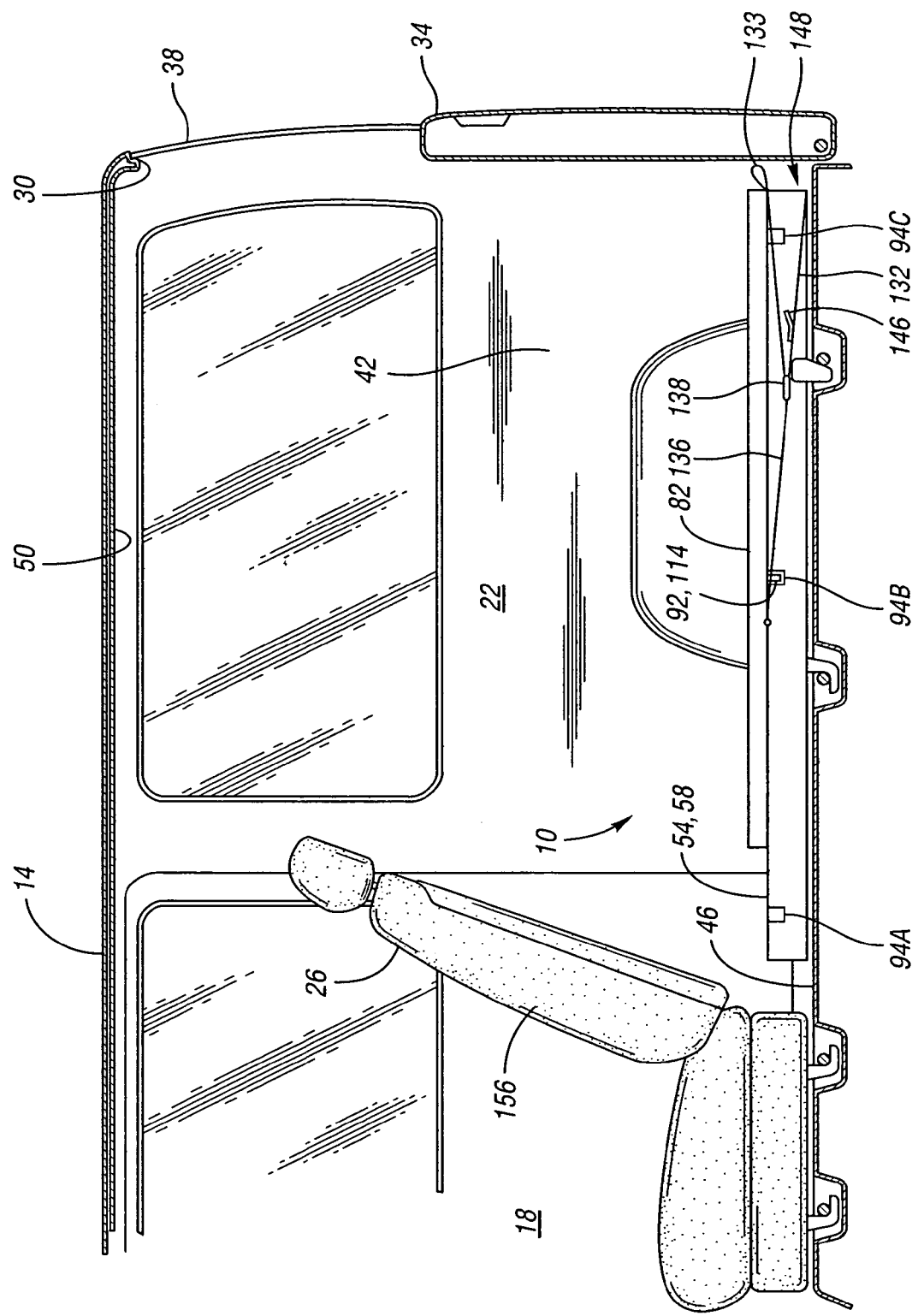
FIG. 8 is a schematic, side sectional view of the load floor in a first, stowed position with respect to the vehicle body.
Figure 9:
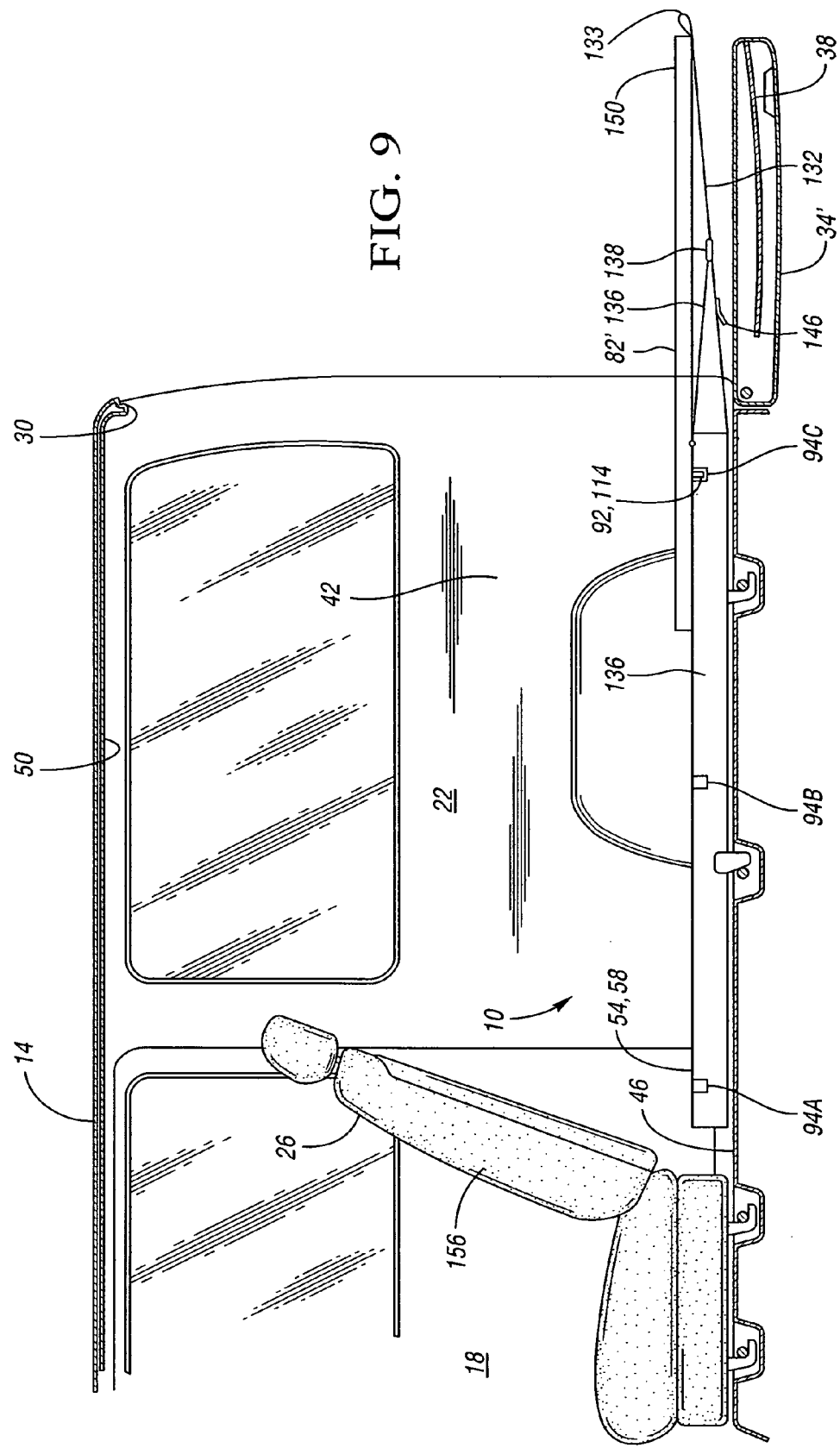
FIG. 9 is a schematic, side sectional view of the load floor in a second, extended position with respect to the vehicle body.
Figure 10:
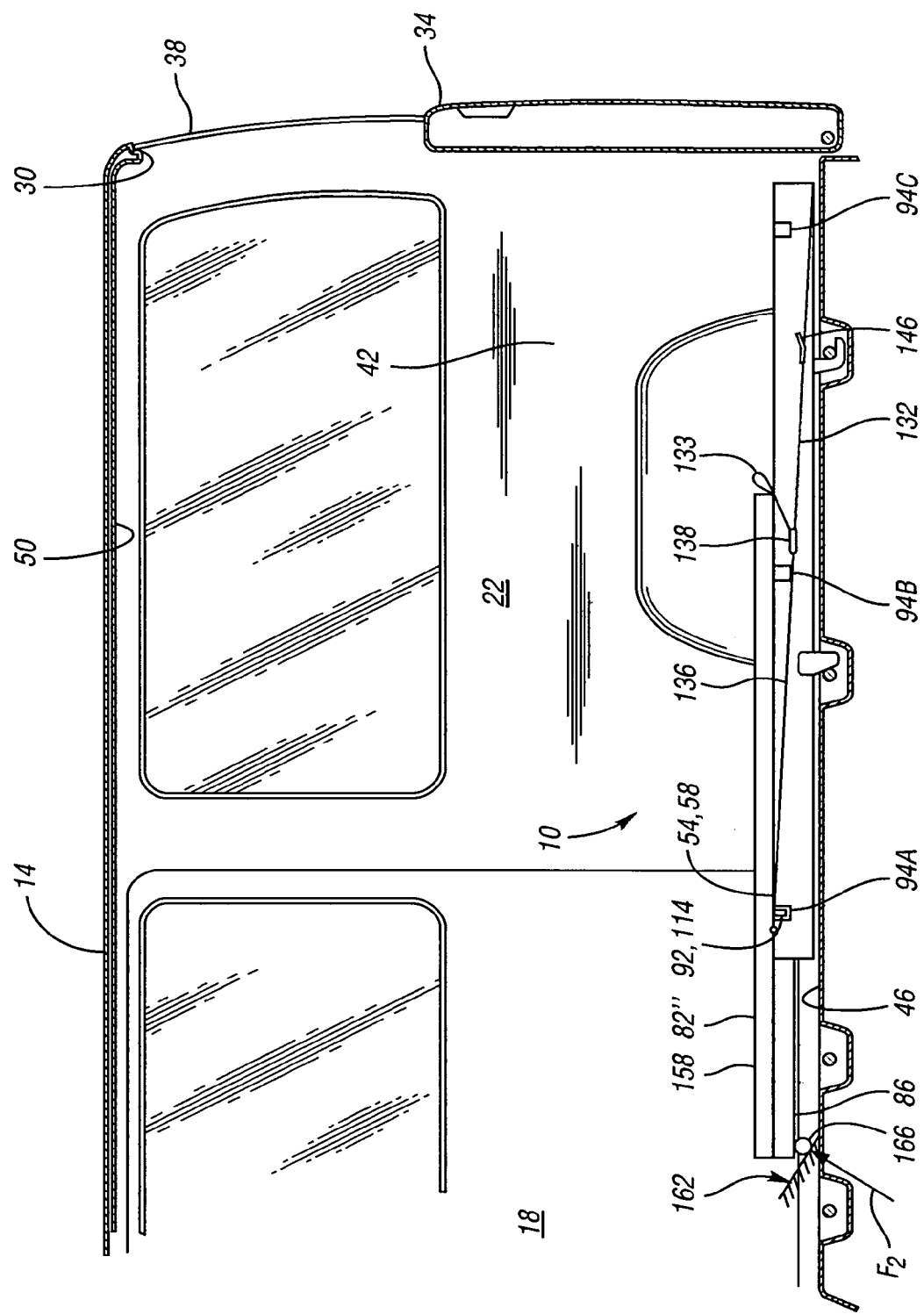
FIG. 10 is a schematic, side sectional view of the load floor in a third, stowed position with respect to the vehicle body.

In the engaged position, at least a portion of the latch plate 114 is within one of the notches 94C to prevent fore and aft movement of the latch plate and, correspondingly, the load floor 82. The notches 94A, 94B, 94C shown in FIGS. 8–10 are substantially identical to notch 94C shown in FIGS. 4 and 5. The notch 94C is partially formed by a surface 122 that is inclined, i.e., downwardly sloped. A surface 126 on the latch plate 114 is inclined and contacts the inclined surface 122 when the latch plate is in the engaged position. The spring 118 biases the latch plate 114 such that the latch plate exerts a force $F_1$ on surface 122 of the rail 58 at surface 126. The force $F_1$ has a vertical component that eliminates any vertical clearances between the roller elements 78 and the tracks 86 to prevent undesirable squeaks and rattles.

It may be desirable to provide roller elements (not shown) on the latch members 114 to reduce the resistance to load floor translation that may be caused by the latch member contacting the rails between notches.

Referring again to FIG. 3, the handle assembly 102 includes a sleeve 128 that receives and retains an end of the cables 98. A member 130 connected to the cables 98 includes a slot 131. A flexible member such as a belt or strap 132 is threaded through the slot 131 and includes a loop at one end forming a pull-handle 133. Only a portion of strap 132 is shown in FIG. 3.

Figure 6:
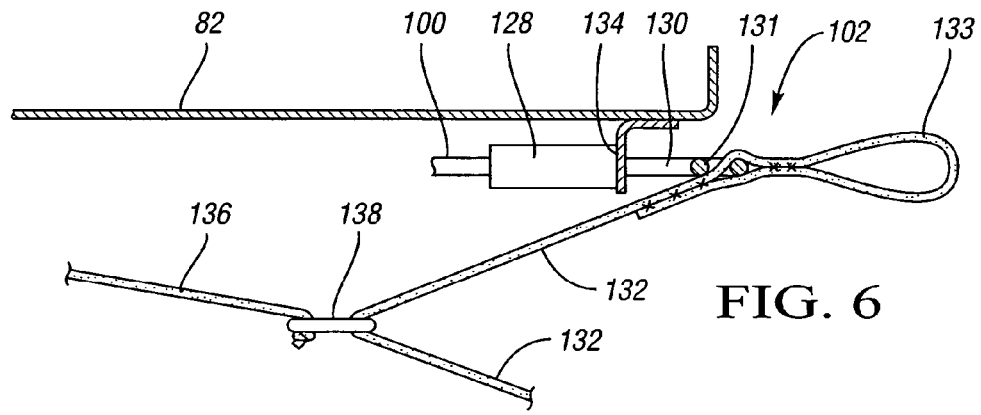
FIG. 6 is a schematic side view of a portion of the latching system of FIG. 3.
Figure 7:
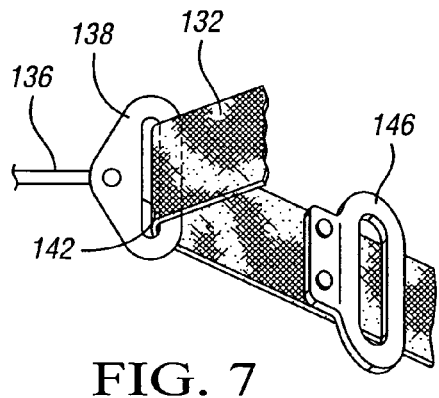
FIG. 7 is schematic perspective view of a portion of the latching system of FIG. 3.

Referring to FIGS. 6 and 7, wherein like reference numbers refer to like components from FIGS. 1–5, the handle assembly 102 is rigidly mounted to the load floor 82 via bracket 134 at the rear end of the load floor 82. An elastic member 136 is slidably connected to the strap 132 via a slide ring 138. More specifically, the slide ring 138 defines a slot 142 through which the strap 132 extends. A second handle 146 is affixed to the strap 132 on the opposite side of the slide ring 138 from the pull-handle 133. The second handle 146 is sufficiently sized and shaped such that the second handle 146 cannot pass through slot 142. Accordingly, the second handle 146 acts as a stop to restrict movement of the strap 132 with respect to the slide ring 138.

Referring to FIG. 8, wherein like reference numbers refer to like components from FIGS. 1–7, the end of strap 132 opposite from the pull-handle 133 is affixed to rear end 148 of the frame 54, and the elastic member 136 is affixed to the load floor 82 forward of the pull-handle 133. Each rail 58 defines three notches 94A, 94B, 94C that are engageable with the latches 92 on the load floor 82 to retain the load floor in a respective one of three positions. The notches 94A, 94B, 94C and latches 92 are shown schematically in FIG. 8, but are as shown and described in FIGS. 3–5.

The load floor 82 is depicted in a first, stowed position with respect to the frame 54 and the vehicle body 14 in which the load floor 82 is entirely located within the cargo area 22, i.e., all of the load floor 82 is forward of the rear body opening 30. The latch plates 114 of latches 92 are engaged with notches 94B on respective rails 58 so that the load floor is retained in the first, stowed position. The pull handle 133 is adjacent to the rear opening 30. The elastic member 136 exerts a forwardly oriented force on the strap 132 via the slide ring 138 to remove the excess slack in the strap 132 that is present when the load floor 82 is in the first, stowed position. This feature prevents the otherwise excess slack in the strap from hanging out the rear of the vehicle where the tailgate assembly 34 could be closed on it.

The load floor 82 is movable to a second, extended position by pulling on pull-handle 133 to disengage latches 92. Referring to FIG. 9, wherein like reference numbers refer to like components from FIGS. 1–8, the tailgate assembly is depicted at 34' in the open position with the window 38 retracted, and the load floor is depicted at 82' in the second, extended position with respect to the frame 54 and the vehicle body 14 in which at least a portion 150 of the load floor extends rearward of the rear body opening 30. The load floor 82' in the extended position facilitates the loading of cargo (not shown) into the cargo area 22. The latch plates 114 of latches 92 engage notch 94C on respective rails 58 so that the load floor is retained in the second position. The strap 132 is of sufficient length so as not to go taut when the sliding load floor is in the extended position.

Referring again to FIG. 5, a stop member 154 attached to the rear end of each of the rails 58 prevents the sliding load floor from being moved beyond its extended position even if the positioning latches 92 are disengaged. The stop members 154 contact the latch brackets 106 and prevent further rearward movement of the sliding load floor. In an alternate embodiment, the stop member may be located elsewhere on the rails 58 other than at the location shown in FIG. 5 and may engage a different protruding member afixed to the load floor 82 to prevent it from being moved beyond its extended position.

Referring again to FIG. 1, the rear passenger seats 26 are depicted in an occupiable condition, i.e., installed with respect to the vehicle body floor 46 and with their respective seatback portions 156 generally upright. The rear passenger seats 26 are selectively reconfigurable to a stowed condition wherein the seats 26 are detached from the floor 46 and removed from the vehicle body 14 or otherwise configured so that the seat does not interfere with forward movement of the load floor, as understood by those skilled in the art. For example, the seatback portions may be folded or collapsed to be generally horizontally oriented, and and the seats may be recessed in a cavity in the floor. Referring to FIG. 10, wherein like reference numbers refer to like components from FIGS. 1–9, the rear row of passenger seats has been removed from the vehicle body 14. The load floor is shown in a third, stowed position at 82" in which the load floor is further forward than in the first position shown in FIG. 8. In the third, stowed position, a portion 158 of the load floor extends forward of the frame 54 and occupies space formerly occupied by the passenger seats when in the occupiable condition. When in the third, stowed position, the load floor exposes the body floor 46 adjacent to the rear body opening 30.

An inclined floor ramp surface 162, which may, for example, be incorporated into the interior trim 42 or be formed by a separate member, is sufficiently positioned and configured to contact an auxiliary roller 166 affixed to the underside of a track 86. As the load floor 82 is translated from the first, stowed position to the third, stowed position, the roller 166 contacts the ramp surface 162; since the ramp surface 162 is inclined, it exerts a force having a vertical component on the roller and, correspondingly, the load floor 82. The vertical component of the force provides support for the portion 158 to prevent a cantilevered condition. In a preferred embodiment, both tracks 86 have a roller 166 attached thereto, each engageable with a corresponding ramp surface 162 in the vehicle body when in the third position.

Pull handle 133 is affixed to the load floor 82, and may be beyond the reach of a vehicle user at the rear opening when the load floor 82 is in the third, stowed position. The latches 92 may be disengaged from notches 94A by pulling the second handle 146, which transmits force to the latches 92 via strap 132, member 130 of FIGS. 3 and 6, and the Bowden cables (shown at 98 in FIGS. 3 and 4).

Figure 11:
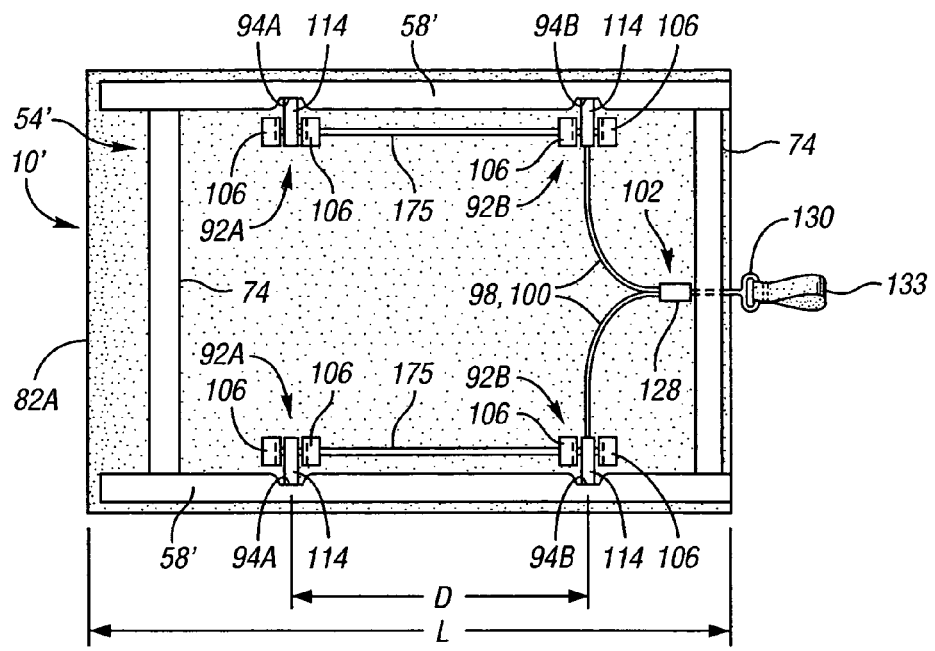
FIG. 11 is a schematic bottom view of an alternative load floor assembly configuration with the load floor in a first, stowed position.

Referring to FIG. 11, wherein like reference numbers refer to like components from FIGS. 1–10, an alternative load floor assembly 10' is schematically depicted. The load floor assembly 10' includes four latches 92A, 92B rigidly connected to the load floor 82A. The latches 92A, 92B each include a latch plate 114 supported between two brackets 106 and pivotable to engage notches 94A, 94B on a respective rail 58'.

Two latches 92A, 92B are engageable with each rail 58'. Forward latches 92A are more forwardly-located relative to the vehicle body than rear latches 92B. Latches 92B are operatively connected to pull-handle 133 via Bowden style cables 98. The latch plate 114 of each rear latch 92B is rigidly connected to the latch plate 114 of a respective front latch 92A for unitary movement therewith, such as by an interconnecting tube or rod 175. Accordingly, when a vehicle user pulls handle 133 to disengage the rear latches 92B, the front latches 92A are also disengaged. Alternatively, it may be desirable for the cables 98 to be connected to the front latches 92A instead of rear latches 92B if connection to the rear latches requires the cables to curve more than is desirable.

The frame 54' is characterized by a length L. The use of a plurality of latches to engage a rail or other detent member enables the load floor 82A to travel a distance greater than the length L of the frame 54' when moving between latching positions. Accordingly, the load floor is shown in a first, stowed position in FIG. 11 that corresponds to the first, stowed position shown in FIG. 8. The forward latches 92A each engage respective forward notches 94A, and the rear latches 92B engage respective rear notches 94B. The forward and rearward notches are spaced a distance D apart, which corresponds to the distance that the load floor can travel in each direction from the first, stowed position until one of the latches engages a notch.

Figure 12:
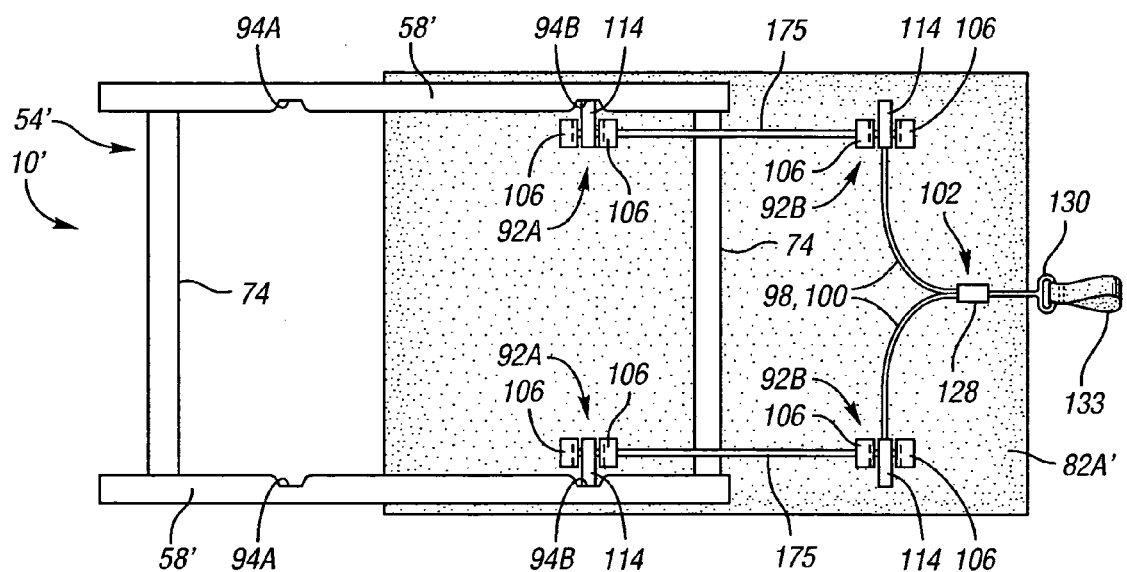
FIG. 12 is a schematic bottom view of the load floor assembly of FIG. 11 with the load floor in a second, extended position.
Figure 13:
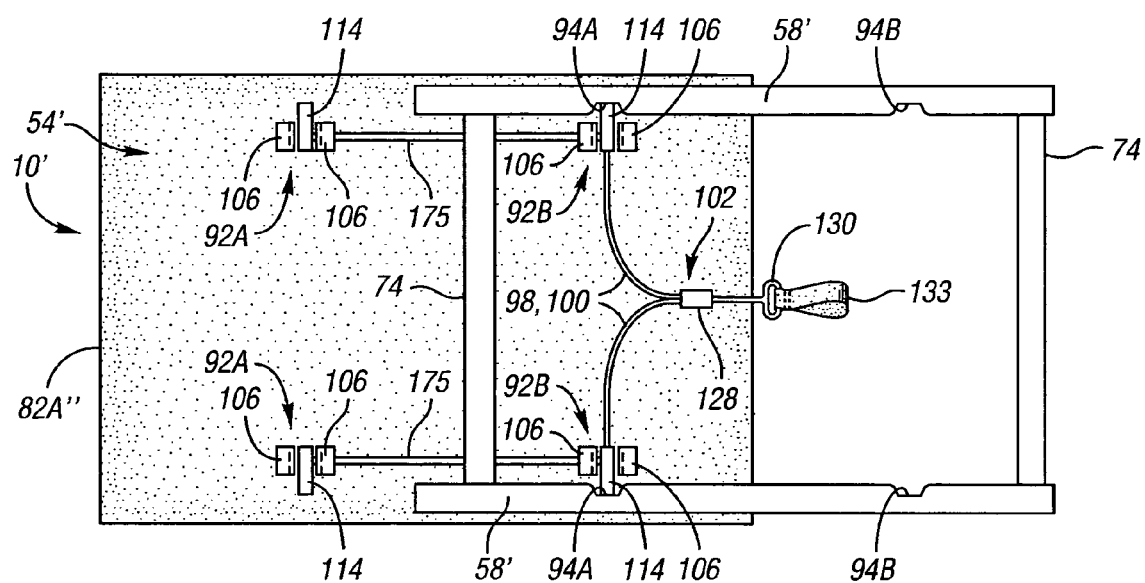
FIG. 13 is a schematic bottom view of the load floor assembly of FIGS. 11 and 12 in a third, stowed position.

Referring to FIG. 12, wherein like reference numbers refer to like components from FIGS. 1–11, the load floor is shown in a second, extended position at 82A' that corresponds to the second, extended position shown in FIG. 9. Rear latches 92B are positioned rearward of the rearward extent of the rails, and, accordingly, do not engage a notch. Forward latches 92A engage rearward notches 94B. Referring to FIG. 13, wherein like reference numbers refer to like components from FIGS. 1–12, the load floor is shown in a third, stowed position at 82A" that corresponds to the third, stowed position shown in FIG. 10. The forward latches 92A are positioned forward of the forwardmost extent of the rails, and the rear latches 92B engage the forward notches 94A.

While the best mode for carrying out the invention has been described in detail, those familiar with the art to which this invention relates will recognize various alternative designs and embodiments for practicing the invention within the scope of the appended claims.

The invention claimed is:

1. A vehicle comprising:
a body having a body floor and defining a cargo area and a body opening adjacent to the cargo area; a load floor within the cargo area, supported above the body floor, and selectively translatable between a first position in which the load floor is entirely within the cargo area forward of the body opening, a second position rearward of the first position in which at least a portion of the load floor extends out of the cargo area beyond the body opening, and a third position in which the load floor is forward of the first position; and a locking system configured to selectively releasably retain the load floor in each of the first, second, and third positions.

2. The vehicle of claim 1, further comprising a member defining an inclined surface sufficiently positioned and configured to exert a vertical force on the load floor when the load floor is in the third position and not in the first and second positions.

3. The vehicle of claim 2, further comprising a roller operatively connected to the load floor and sufficiently configured and positioned such that the roller contacts the inclined surface when the load floor is in the third position.

4. The vehicle of claim 1, wherein the locking system includes a latch member and at least one detent member defining at least one notch, the latch member being selectively engageable with said at least one detent member by at least partially entering said at least one notch to restrict relative movement between the load floor and the frame.

5. The vehicle of claim 4, further comprising a first handle and a second handle connected to the load floor such that the first handle is rearward of the second handle when the load floor is in the second position, and the second handle is rearward of the first handle when the load floor is in the third position; and wherein the first and second handles are operatively connected to the latch member to selectively disengage the latch member from said at least one notch.

6. The vehicle of claim 5, further comprising a flexible member operatively connecting the second handle to the locking system and the body floor; and a tension device slidingly connected to the flexible member and configured to exert a forwardly-oriented force on the flexible member.

7. The vehicle of claim 6, wherein the tension device is an elastic member operatively connected to the load floor.

8. The vehicle of claim 5, further comprising a spring configured to bias the latch member against said at least one detent member when the latch member is engaged with said at least one notch such that the latch member exerts a force having a vertical component on the detent member.

9. The vehicle of claim 1, further comprising a passenger seat selectively movable between an occupiable condition and a stowed condition; and wherein at least a portion of the load floor in the third position occupies space occupied by the passenger seat in the occupiable condition.

10. The vehicle of claim 1, further comprising a load floor frame supporting the load floor and releasably connected to the body floor.

11. A load floor assembly for installation in a vehicle comprising:
a frame;
a load floor;
a plurality of roller elements being operatively connected to one of the frame and the load floor;
a track being operatively connected to the other of the frame and the load floor and engaging said plurality of roller elements to enable translation of the load floor with respect to the frame;
at least one latch member being operatively connected to one of the load floor and the frame;
at least one detent member being operatively connected to, or forming part of, the other of the load floor and the frame, said at least one detent member defining at least one notch, said at least one latch member being selectively releasably engageable with said at least one notch to restrict translation of the load floor with respect to the frame; and
at least one spring being operatively connected to said at least one latch member and configured to bias said at least one latch member such that said at least one latch member exerts a force on said at least one detent member when said at least one latch member is engaged with said at least one notch, the force having a component orthogonal to the direction of load floor translation with respect to the frame.

12. The load floor assembly of claim 11, wherein said at least one latch member is operatively connected to the load floor; and wherein the load floor assembly further comprises a first handle affixed with respect to the load floor; a flexible member affixed with respect to the frame and sufficiently operatively connected to said at least one latch member such that a tensile force exerted on the flexible member disengages said at least one latch member; and a second handle connected to the flexible member.

13. The load floor assembly of claim 12, further comprising a tension device slidingly connected to the flexible member and configured to exert a forwardly-oriented force on the flexible member.

14. The load floor assembly of claim 11, wherein said at least one latch member includes a first latch member and a second latch member; wherein said at least one notch includes a first notch; and wherein the load floor is movable between a first position in which the first latch member engages the first notch and a second position in which the second latch member engages the first notch.

15. The load floor assembly of claim 14, wherein said at least one notch includes a second notch; and wherein the load floor is movable to a third position in which one of the first and second latch members engages the second notch.

16. A vehicle comprising:

a body having a body floor and defining a cargo area and a body opening adjacent to the cargo area;

a load floor within the cargo area, supported above the body floor, and selectively translatable between a first position in which the load floor is entirely within the cargo area forward of the body opening, a second position rearward of the first position in which at least a portion of the load floor extends out of the cargo area beyond the body opening, and a third position in which the load floor is forward of the first position;

a locking system configured to selectively releasably retain the load floor in each of the first, second, and third positions; and a passenger seat selectively movable between an occupiable condition and a stowed condition; and wherein at least a portion of the load floor in the third position occupies space occupied by the passenger seat in the occupiable condition.

* * * * *